Figure 2:
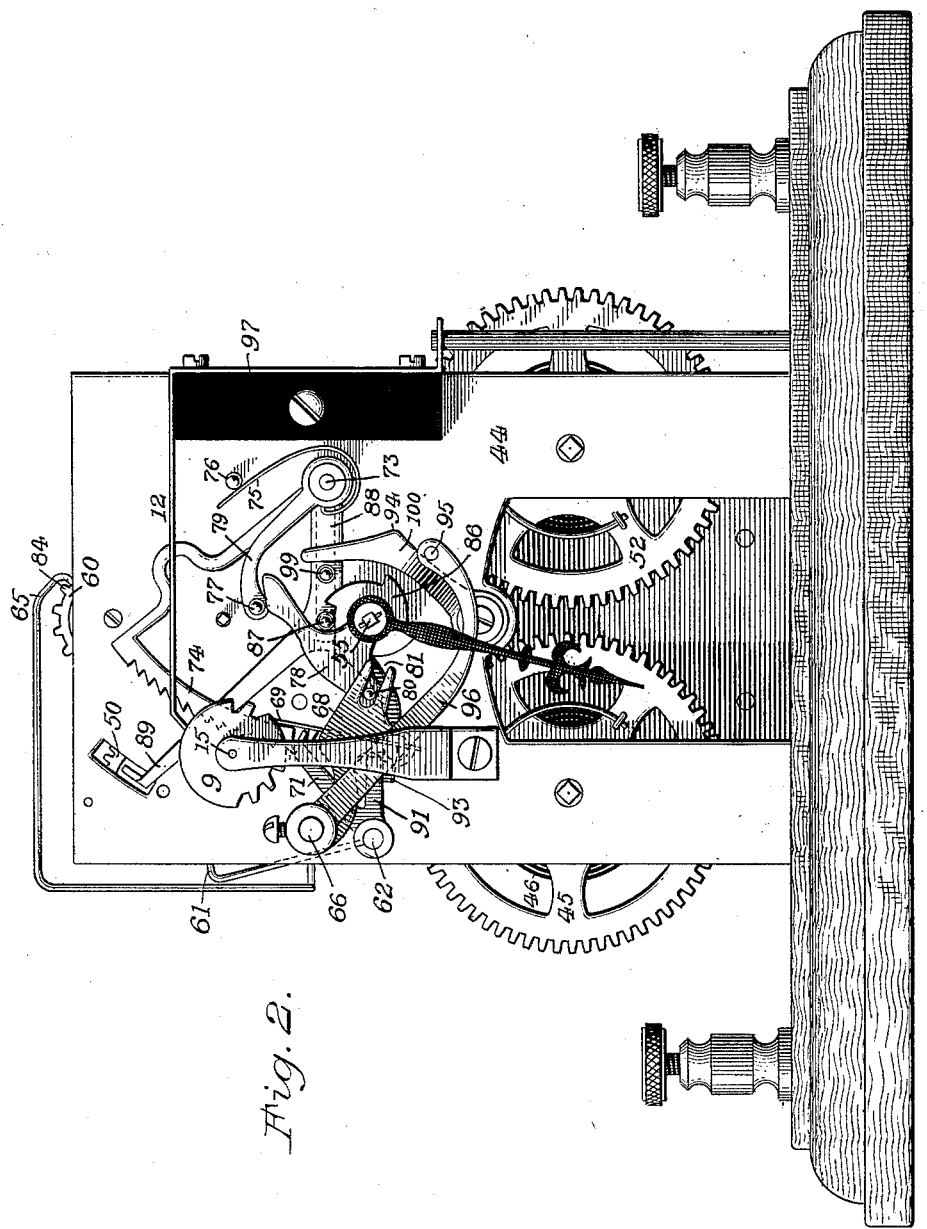

No. 706,218.  
R. G. CALLUM.  
ELECTRIC SIGNALING SYSTEM AND APPARATUS USED THEREIN.  
(Application filed Jan. 9, 1902.)  
(No Model.)  
Patented Aug. 5, 1902.  
7 Sheets—Sheet 1.
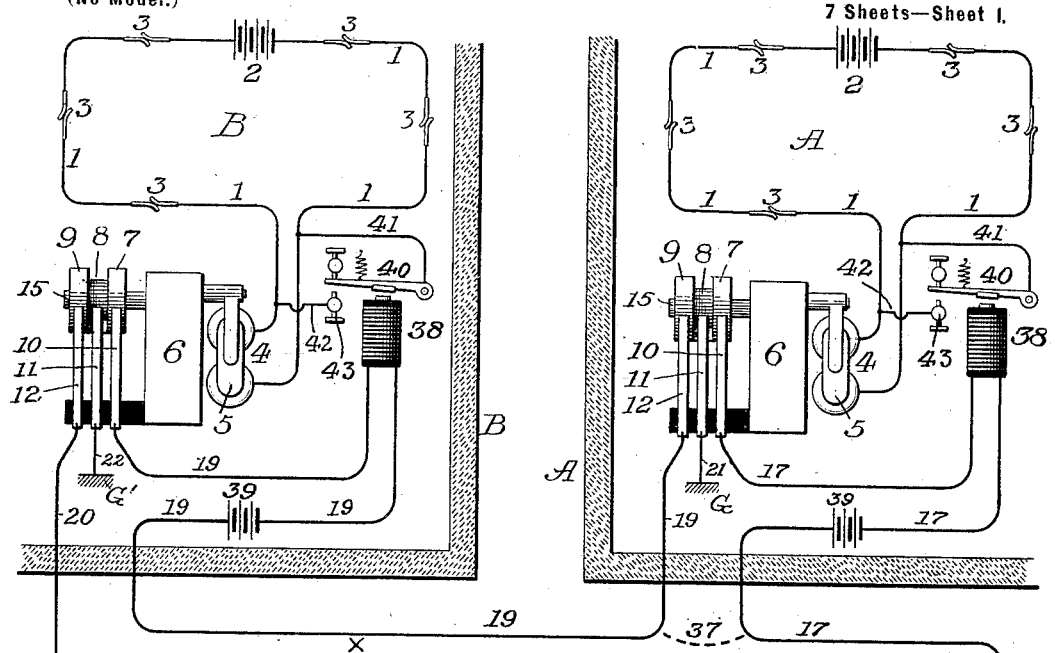
Fig. 1.
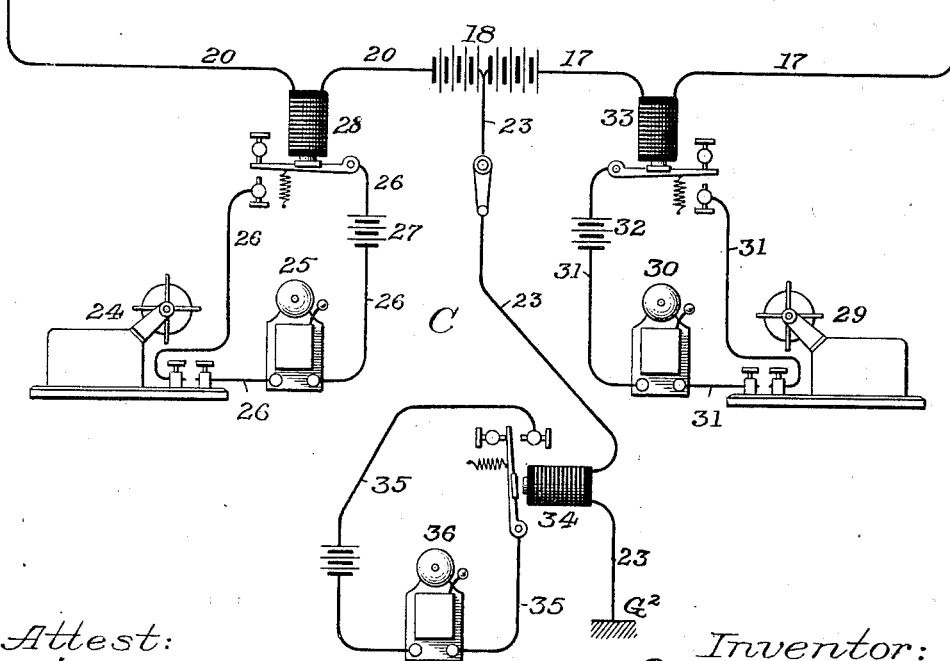
Attest:  
C. M. Fowler  
C. A. Neale
Inventor:  
Robert G. Callum  
By Howell Bartle  
Attorney.

No. 706,218. Patented Aug. 5, 1902.
R. G. CALLUM.
ELECTRIC SIGNALING SYSTEM AND APPARATUS USED THEREIN.
(Application filed Jan. 9, 1902.)
(No Model.) 7 Sheets—Sheet 2.

Attest:
C. N. Fowler
C. A. Neale

Inventor:
Robert G. Callum
By Howell Bartle
Attorney

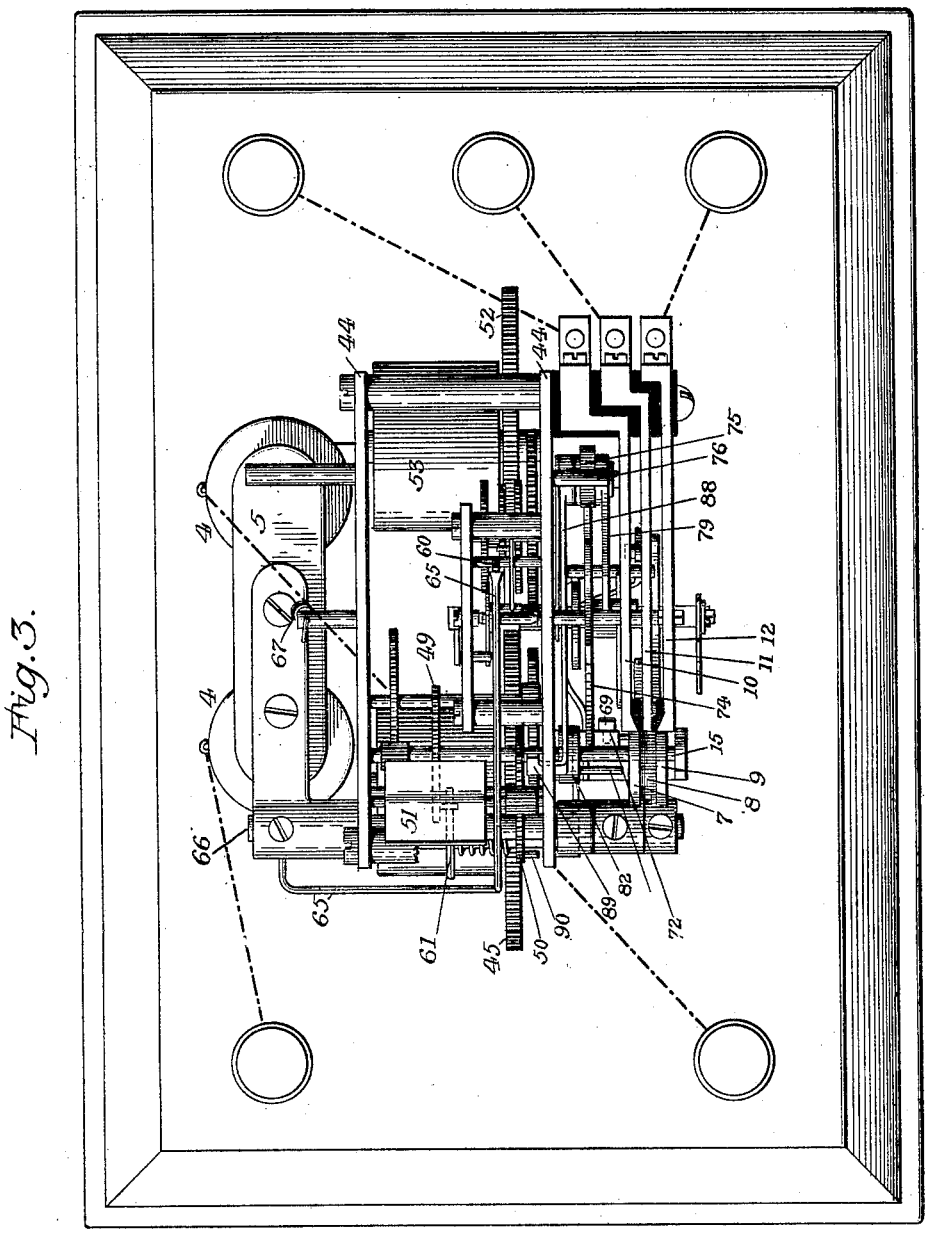

No. 706,218. Patented Aug. 5, 1902.
R. G. CALLUM.
ELECTRIC SIGNALING SYSTEM AND APPARATUS USED THEREIN.
(Application filed Jan. 9, 1902.)
(No Model.) 7 Sheets—Sheet 4.
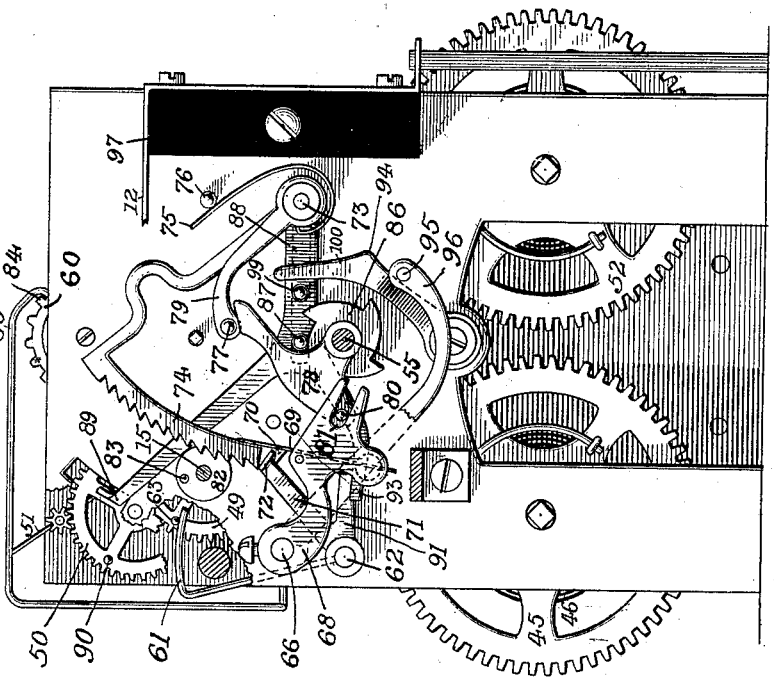
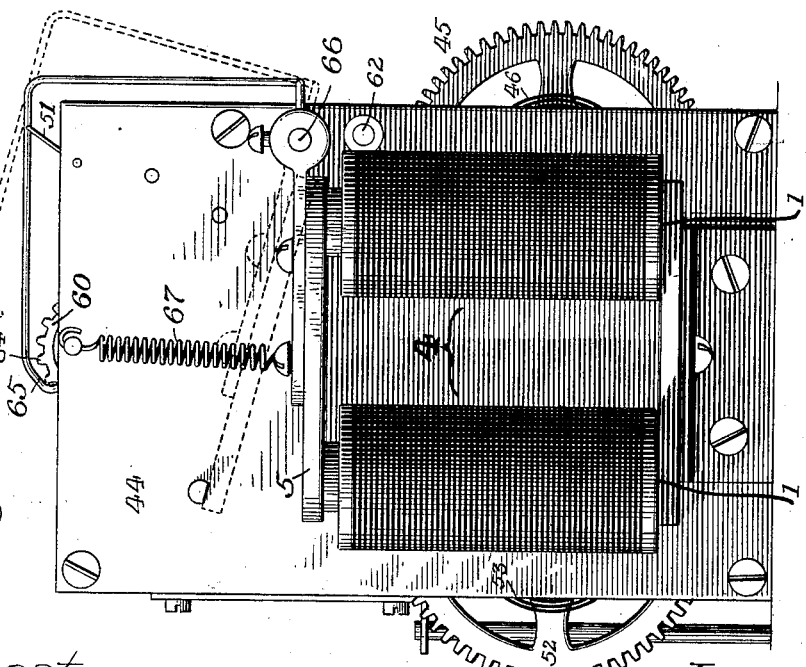
Attest:
C. H. Fowler
E. H. Neale
Inventor:
Robert G. Callum
By Howell Battle
Attorney.
THE NORRIS PETERS CO., PHOTO-LITHO., WASHINGTON, D. C.

No. 706,218. Patented Aug. 5, 1902.
R. G. CALLUM.
ELECTRIC SIGNALING SYSTEM AND APPARATUS USED THEREIN.
(Application filed Jan. 9, 1902.)
(No Model.) 7 Sheets—Sheet 5.
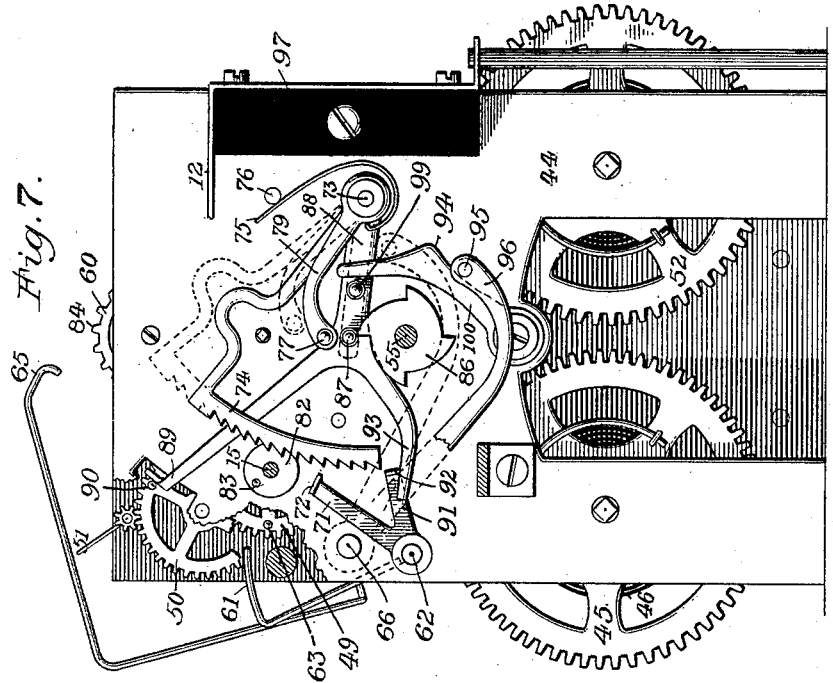
Attest:
C. N. Fowler
C. A. Neale
Inventor:
Robert G. Callum
By Howell Bartle
Attorney No. 706,218. Patented Aug. 5, 1902.
R. G. CALLUM.
ELECTRIC SIGNALING SYSTEM AND APPARATUS USED THEREIN.
(Application filed Jan. 9, 1902.)

(No Model.) 7 Sheets—Sheet 6.

Attest:
C. N. Fowler
C. H. Neale

Inventor:
Robert G. Callum
By Lowell Zortle
Attorney.

No. 706,218. Patented Aug. 5, 1902.
R. G. CALLUM.
ELECTRIC SIGNALING SYSTEM AND APPARATUS USED THEREIN.
(Application filed Jan. 9, 1902.)
(No Model.) 7 Sheets—Sheet 7.
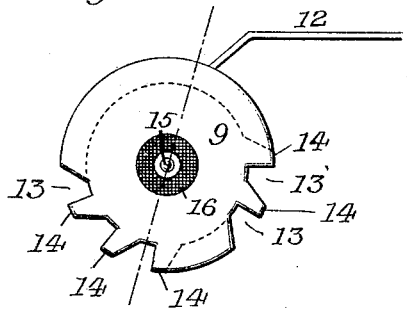
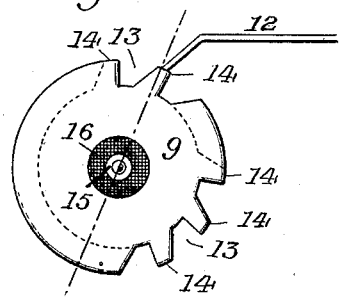
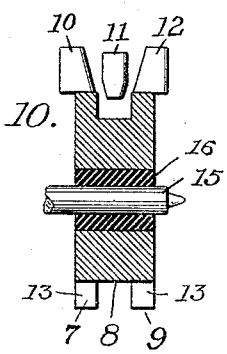
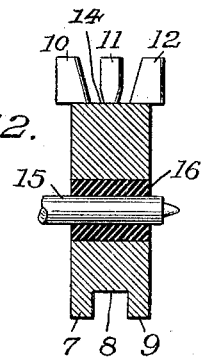
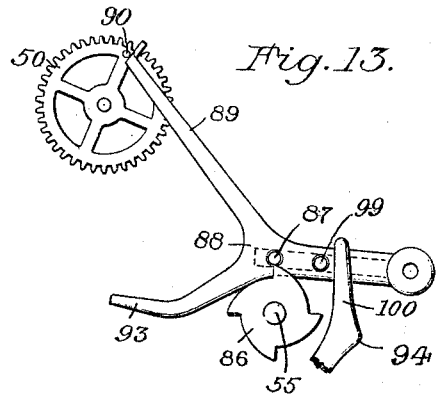
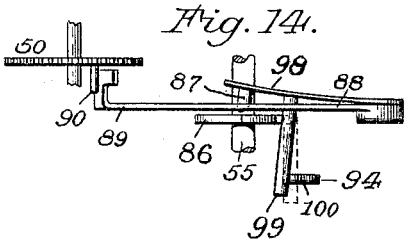
Attest:
C. H. Fowler
C. A. Neale
Inventor:
Robert G. Callum
By Dowell & Bartle
Attorney

UNITED STATES PATENT OFFICE.

ROBERT G. CALLUM, OF WASHINGTON, DISTRICT OF COLUMBIA.

ELECTRIC SIGNALING SYSTEM AND APPARATUS USED THEREIN.

SPECIFICATION forming part of Letters Patent No. 706,218, dated August 5, 1902.

Application filed January 9, 1902. Serial No. 89,015. (No model.)

*To all whom it may concern:*

Be it known that I, ROBERT G. CALLUM, a citizen of the United States, residing at Washington, in the District of Columbia, have invented new and useful Improvements in Electric Signaling Systems and Apparatus Used Therein, of which the following is a specification.

My invention relates to electric signaling systems in which signals are automatically transmitted to a central station from points more or less remote therefrom, and while my said invention is applicable to such a system regardless of its particular application or use it has been devised with special reference to automatic fire or burglar alarm systems.

The main objects of my invention are, first, to insure the transmission of a proper signal even though the main circuit connecting the point to be signaled from with the central station be broken or grounded; second, to insure the transmission of the proper signal even though the point to be signaled from be "looped" out of the main line; third, to render test-signals or a close watch on the condition of the main line unnecessary, and, fourth, to provide for a repetition of the alarm-signal at predetermined intervals to insure proper attention both to the original cause of the alarm and also to the replacing of the system or apparatus in proper working condition.

Broadly stated, my invention consists in connecting the point to be signaled from with the central station by a normally closed metallic circuit which is provided with a ground connection at the central station, dividing the batteries of the circuit so that a portion will be on one side and the other portion on the other side of said connection, and in providing in said circuit means for grounding the circuit at the signaling-point and transmitting signals over said circuit at both sides of said ground connection.

For carrying out my invention I have devised, in addition to a novel arrangement of circuits, a circuit-breaking or signaling instrument which is controlled by a local circuit and which upon the breaking or short-circuiting of said local circuit automatically grounds the main circuit between two circuit-breaking wheels which transmit signals from each side of said ground, as will be hereinafter explained.

After a detail description of my invention the features deemed novel will be specified in the claims hereunto annexed.

Figure 8:
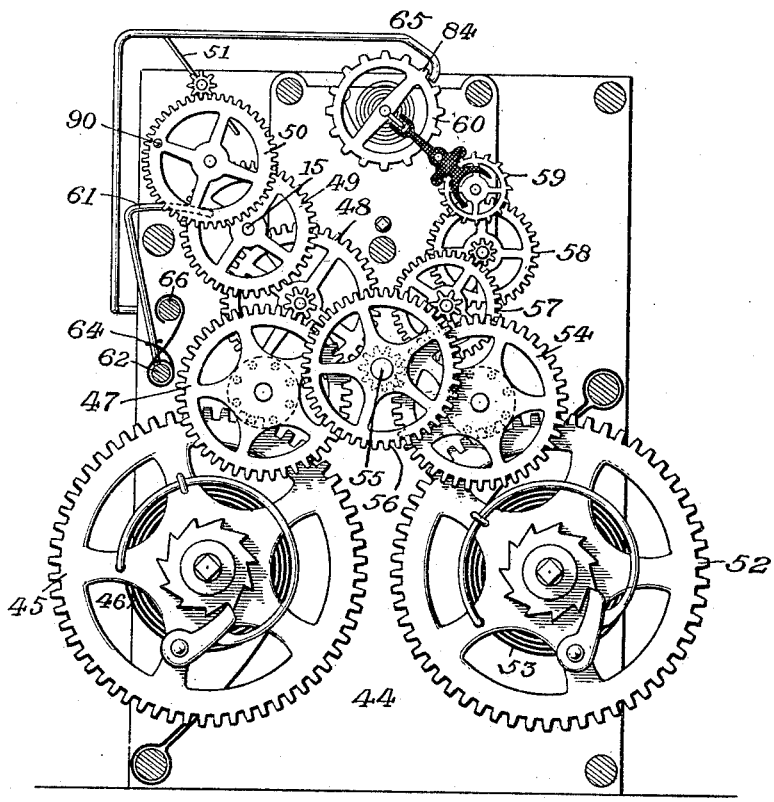

Referring to the drawings which form a part of this specification, Figure 1 is a diagrammatic illustration of an automatic signaling system embodying my invention. Figs. 2, 3, and 4 illustrate my novel signaling instrument in front, top, and rear views, respectively. Figs. 5, 6, and 7 are views illustrating the positions assumed by the several working parts of said instrument during its operation. Fig. 8 is a view of said instrument with the front frame-plate removed for disclosing the operating-gearing. Figs. 9, 10, 11, and 12 are detail views of the circuit-breaking wheels and their coöperating brushes, and Figs. 13 and 14 are detail views of a part of said instrument.

Referring to Fig. 1, A and B represent buildings or structures from which signals are to be automatically transmitted to a central station or office C whenever said buildings are entered—*i. e.*, if the system be a burglar-alarm system—or whenever the temperature in said buildings rises to a danger-point if the system be used as an automatic fire-alarm system. Each building within the system is equipped with a local circuit 1, having its own battery 2 and provided with the usual devices 3 for short-circuiting or breaking the circuit whenever the building is entered or a fire occurs, as will be understood. Included in the local circuit 1 is an electromagnet 4, which attracts an armature 5 for holding in check a clock mechanism 6, which controls the rotation of circuit-breaking wheels 7, 8, and 9. Magnet 4, clock mechanism 6, and circuit-breaking wheels 7, 8, and 9 form parts of a novel signaling instrument, to be hereinafter described in detail. The circuit-breaking wheels 7, 8, and 9 each have an appropriate contact-brush 10 11 12, and said wheels may be separately formed and separated from each other so long as they are electrically connected; but, as shown in Figs. 9, 10, 11, and 12, they are formed together from a single piece of metal. The wheels 7 and 9 are exact counterparts, and each is normally in contact with its appropriate brush, as shown in Figs. 10 and 11, and they are both notched, as at 13, for interrupting at the same moment a current passing from brush 10 through the wheels to brush 12 for indicating at the central office a number corresponding to that given to the building in which the circuit-breaker is located, as will be understood. The middle wheel 8 is normally out of contact with its brush 11, but is arranged to make contact therewith just prior to and during the intermission between the breaks made by the wheels 7 and 9, and for this purpose wheel 8 is provided with projections at the points marked 14 in Figs. 9, 11, and 12. Figs. 9 and 10 indicate the normal position of said wheels—i.e., when they are at rest—and Figs. 11 and 12 a position of said wheels during their revolution. All three wheels are insulated from their supporting-shaft 15 by rubber or other insulating material 16, as clearly indicated. Brush 10 in building A is connected by a line-wire 17 to a battery 18, located at the central office. Brush 12 in said building is connected by wire 19 to brush 10 in building B, and brush 12 in said building is connected by line-wire 20 to the battery 18, thus forming a complete metallic circuit between said buildings and the central office. Brush 11 in building A, which coöperates with wheel 8 between wheels 7 and 9, is connected to ground G by a wire 21, and corresponding brush 11 in building B is similarly connected to ground G' by wire 22. Any number of buildings may be connected in the circuit, but two are deemed sufficient for illustrating the practical working of the system. Battery 18 is divided in the center by a wire 23, which connects with ground $G^2$, and at each side of said battery are relays for separately controlling two sets of signal receiving or recording instruments. The set at the left of the battery consists of a recorder 24 and a single tap-bell 25, both of which are connected in a local circuit 26, having its own battery 27 and controlled by a relay 28 in the main-line wire 20, which opens or closes said local circuit, according to whether the latter is intended to be operated upon a closed or open circuit. The receiving and recording instruments at the right of the battery are exact duplicates of those at the left, a recorder 29 and bell 30 being similarly connected in a local circuit 31, having its own battery 32 and controlled in the same manner by a relay 33 in the line-wire 17.

It is now to be understood that should the local circuit 1 in building A be short-circuited or broken by the operation of any of the devices 3 magnet 4 will release its armature 5 and cause the clock mechanism 6 to rotate the circuit-breaking wheels 7, 8, and 9. The action of said wheels is as follows: The current from battery 18 is normally flowing through wire 17 to brush 10 in building A, through the wheels 7 8 9, back to battery by way of brush 12. The circuit-breaking wheel 8 first makes contact with its brush 11 and establishes a ground through wire 21 to ground G, thus dividing what was before a single metallic circuit into two closed ground-circuits, one of which runs from ground $G^2$ through wire 23, a portion of battery 18, wire 17, through brush 10 and circuit-breaking wheels 7 and 8 to brush 11, and thence to ground G by way of wire 21. The other circuit runs from ground G through wire 21, brush 11, wheels 8 and 9, brush 12, wire 19 to brush 10 in building B, through the wheels 7, 8, and 9 and brush 12 in that building, and out on wire 20 to the other portion of battery 18 to ground $G^2$ by way of wire 23. The ground connection at G being established, the wheels 7, 8, and 9 continue their rotation, the wheel 7 breaking the current in one of said circuits and the wheel 9 in the other, the signals from both being separately received and recorded by the recording instruments 24 and 29, each break in the circuits causing the relays 28 and 33 to close the local circuits 26 and 31, controlling said instruments, as will be readily understood. The wheel 8 may be made to maintain the ground connection at G during the entire time signals are being given by the wheels 7 and 9; but, as shown, said wheel is formed to break connection at the same moment the current is broken by the other wheels, this construction being simply incidental to forming the three wheels integral or from a single piece of metal.

As thus far described it will be readily seen that should the main circuit be broken at any one point a signal will nevertheless be transmitted to the central office by the breaking or short-circuiting of the local circuits 1. If, for instance, the line be broken at the point marked X in the wire 19, connecting two buildings, the operation of the clock mechanism in building A would result in a signal being sent to the central office over wire 17, where it would be recorded by the recorder 29, and the operation of the clock mechanism 6 in building B would result in a signal being recorded at the central office on the recorder 24, which would be received over the wire 20. If wire 17 be broken or grounded, signals would be received from both buildings over wire 20, and in like manner signals from both buildings would be received over wire 17 should wire 20 be broken or grounded. A simple break in the main line will be promptly indicated by the running of both recorders 24 and 29 and by the tapping of both bells 25 and 30, which would result from both relays 28 and 33 releasing their armatures; but a ground may occur in the main line and the fact remain undiscovered until an alarm is received from one of the protected buildings. The ground would then be indicated by the operation of but one set of recording instruments. For instantly indicating a grounding of the main-line current I provide an open relay 34 in the ground-wire 23, said relay being adjusted to close a local circuit 35 and ring a bell 36 when the current through said wire is increased by a ground in the main line. When there is a ground on the main line, current will flow through wire 23 the same as when a ground is established by the signaling instrument, as before described. The signal-receiving instruments will remain unaffected by a ground, so that when circuit 35 is closed and the bell 36 operated it will be known at once that the main line is grounded; but, as before explained, the system will be unaffected by such ground so far as the sending and receiving of signals is concerned.

In signaling systems operating upon a normally closed metallic circuit it is possible to loop out a signaling instrument without the fact being discovered. With the system just described a signal will be sent and received from any of the signaling instruments, even though the particular instrument be looped out of the circuit. If, for instance, the line-wires entering the building A be connected by a loop, as indicated in dotted lines at 37, such connection can in no manner interfere with the transmission of separate signals over both wires, as already explained. It would be possible, however, to first connect a loop and then cut the wires entering the building without detection, and to guard against this and also to provide for instantly indicating the presence of a loop I provide in each building a relay 38 of about six ohms resistance, which is placed in the main-line circuit by being connected to one of the line-wires entering the building. Within the same line-wire is also placed a two-cell battery 39 to balance the resistance of said relay. Armature 40 of the relay is connected by a wire 41 with one of the wires of circuit 1, entering the magnet 4, and the other of said wires is connected by wire 42 to a contact 43, with which armature 40 engages when attracted by its magnet, so that when said armature is attracted by its magnet magnet 4 will be short-circuited and release its armature 5 and cause a signal to be sent to the central office. Relay 38 being of low resistance will not attract its armature, which is held from said magnet by a retractile spring, until the resistance of the main line is removed from the relay-circuit. If now the main-line wires be connected by a loop 37, the resistance of the main line will be removed from the circuit of relay 38 and a circuit established through the relay to brush 10, circuit-breaking wheels 7, 8, and 9, brush 12, through line-wire to and through the loop 37 and the other line-wire, through battery 39 to relay, which will immediately close the local circuit through the armature 40 and contact 43 and short-circuit magnet 4, which will result in a signal being sent to the central office, as already explained.

Now referring to the signaling instrument illustrated in Figs. 2 to 14, inclusive, 44 indicates two frame-plates, between which are mounted two trains of gear-wheels, one of which drives the circuit-breaking wheels 7, 8, and 9, before referred to, and constitutes the alarm-train. The other is a time-train that operates after an alarm has been given to trip the alarm-train for repeating the alarm at predetermined intervals to insure attention both to the original cause of the alarm and to the resetting or replacing of the apparatus in proper working condition. The two trains correspond in all essential respects to the striking and time trains of an ordinary striking-clock. The alarm-train consists of a driving-gear 45, which is driven in the usual way by a spring 46 for driving a second gear 47, which in turn drives a third gear 48, the latter driving a shaft 15, carrying the circuit-breaking wheels before referred to. Shaft 15 carries a fourth gear 49, which drives a fifth gear 50, meshing with a pinion on the shaft of a governor-fan 51, all as clearly shown in Fig. 8. The time-train consists of a driving-gear 52, which is driven by a spring 53 for driving a second gear 54, which drives a shaft 55, corresponding to the minute-hand shaft of an ordinary clock. Shaft 55 carries a third gear 56, which drives a fourth gear 57, which in turn drives a fifth gear 58, the latter driving an escape-wheel 59, controlled by a pallet, and a balance-wheel 60 in the usual manner. The alarm-train is held in check by a detent 61, which is attached to a rock-shaft 62 and normally held in the path of a pin 63, (see Fig. 5,) which projects from the gear 49, said detent being so held by a light spring 64. (Shown in Fig. 8.) The time-train is held in check by a detent 65, which is normally held in engagement with the balance-wheel 60 by the armature 5 of electromagnet 4, which is at the rear of the instrument and which has been heretofore referred to in connection with the description of Fig. 1. Detent 65 is secured or attached to a rock-shaft 66, to which armature 5 is fixedly secured, in a manner to rock said shaft when released by its magnet, said armature being attached to a spring 67 for causing it to move away from the magnet when released therefrom, as shown in Fig. 4. Rock-shaft 66 extends to the front of the instrument, where it is provided with an arm or lever 68, to which is attached a spring-arm 69, made of thin flat spring metal, which carries a latch or projection 70. On the front end of rock-shaft 62, which also extends to the front of the instrument, is an arm 71, having a bent end 72, which normally rests on or directly above the projection 70 on the spring-arm 69, as clearly shown in Fig. 5. When magnet 4 releases its armature 5, rock-shaft 66 is moved by the spring 67 and arm or lever 68 is carried to the position illustrated in Fig. 6, and during its movement latch 70 moves arm 71 to the position indicated in dotted lines in said figure, said latch 70 riding over the end of said arm and permitting it to drop back beneath said latch, as shown. This movement of arm 71 moves rock-shaft 62 and causes detent 61 to move away from pin 63 and release the alarm-train for rotating the circuit-breaking wheels 7, 8, and 9, already referred to.

Pivotally mounted on a stud 73 is a segmental rack 74, which is backed by a spring 75, bearing against a stud 76. The lower end of said rack is normally supported on the bent end 72 of the arm 71, as shown in Fig. 5. When arm 71 is moved to the position indicated in dotted lines in said figure, rack 74 is free to fall or drop until arrested by a pin 77, coming in contact with a stop 78, said pin being mounted on an arm 79, which is secured to the hub of the rack 74, as clearly shown. Stop 78 is loosely mounted on shaft 55 and is supported in proper position by means of a pin 80, which projects from said stop into a slot formed in the end of arm 68. The arm 71 after being moved by the spring-latch 70 drops back into engagement with one of the teeth of rack 74, in which position detent 61 is still out of range of the pin 63 on gear 49. Mounted on the shaft 15 is a small wheel 82, carrying a pin 83, which when said wheel revolves engages the teeth of rack 74 and raises said rack the distance of one tooth at each revolution of said shaft, and arm 71 acts as a pawl for holding the rack to the position to which it is moved. When the rack is raised to its original position, arm 71 drops to its original position and detent 61 moves back to the path of pin 63 and arrests the rotation of the gearing. The circuit-breaking wheels 7, 8, and 9 being mounted on the shaft 15, it will be seen that they will be permitted to make as many revolutions as there are teeth on the rack 74, which drop below the bent end 72 of arm or pawl 71, this number being regulated by the position of pin 77 with reference to the rack, the arm upon which said pin is mounted being adjusted for permitting the rack to fall to a greater or less degree before being arrested in its fall by the stop 78. As shown in the drawings, arm 79 is adjusted to permit the rack to fall, so that four teeth will be below the pawl or arm 71, which allows the break-wheels to revolve four times for sending four signals in succession before the mechanism is stopped, as explained.

In prior signaling instruments time mechanism has been used for tripping the alarm-train at predetermined intervals for the purpose of indicating that the line-wires are in proper working condition. With my system no such signals are required, and the time-train is held in check by the detent 65 until a cause arises for sending a danger-signal and releases armature 5 from its magnet 4. Detent 65 is normally held between projections 84 on the balance-wheel 60, and when magnet 4 releases its armature detent 65 is moved in a line tangent to said wheel and by engaging with one of the projections 84 gives a starting impulse to said wheel for initially starting the timing mechanism.

On shaft 55, which is timed to make one revolution every hour, is a cam-wheel 86, having four cam-faces which engage a pin 87, carried by a two-armed lever 88, and raises said lever and permits it to drop every fifteen minutes or as many times per hour as there may be cam-faces on said wheel. Lever 88 is pivotally mounted on the stud 73, and one of its arms 89 is bent at its end to extend through an opening in the frame 44, so that when lever 88 is raised the bent end of arm 89 will be in the path of a pin 90, carried by the gear-wheel 50, as shown in Fig. 7, and when said lever is in its lowest position said arm will be out of such path, as shown in Figs. 5 and 6. Rock-shaft 62 has a second arm 91, which has a bent end 92 lying directly above the other arm 93 of lever 88 and which is best shown in Fig. 7. After an alarm has been given by the tripping of the alarm-train and the time-train has been set in motion, as already described, cam-wheel 86 will begin to raise lever 88 by pushing up the pin 87, and arm 93 of said lever will engage and gradually raise arm 91 on rock-shaft 62 until detent 61 releases the gear-wheel 49. By the time this is accomplished arm 89 will be in position to engage pin 90 on gear-wheel 50 and still hold the alarm-train in check. The raising of arm 91 will cause arm 71 to move away from rack 74 and permit it to fall, as heretofore explained. As soon as cam-wheel 86 revolves far enough lever 88 will drop to its lowest position, aided by the spring 64, which acts on detent 61, and cause arm 91 to bear down on arm 93 of said lever 88. When said lever assumes its lowest position, arm 89 is removed from the path of pin 90, and the alarm-train is free to revolve, the action thereof being the same as heretofore explained. It will thus be seen that the time-train causes an alarm to be given every fifteen minutes after an original alarm or as often as may be desired, the number of repetitions per hour being regulated by the number of cam-faces on the cam-wheel 86. Should lever 88 be in its raised position when the instrument is set for service, no alarm can be instantly given unless provision be made for instantly removing arm 89 from the path of pin 90. To provide for this, I attach pin 87 of lever 88 to the end of a flat spring 98, which is secured to the back of the lever, with the pin 87 projecting through a hole to the front of the lever, as shown in Figs. 13 and 14. Secured to spring 98, between its point of connection with lever 88 and the pin 87, is a second pin 99, which is longer than pin 87 and which projects through to the front of the lever, so that when moved toward pin 87, as in Fig. 14, spring 98 will be pushed back and draw pin 87 back and away from the cam-wheel 86 and leave lever 88 free to drop to its lowest position. Pivotally mounted on the frame 44 is a lever 100, having its end in position to strike and move pin 99 in the manner described. Lever 100 is provided with a cam-face 94, which is in the path of a pin 95, carried on the end of a lever or arm 96, secured to the rock-shaft 66, so that when said shaft is rocked by the release of armature 5, as already explained, pin 95 will pass over the cam-face on lever 100 and cause said lever to move pin 99, as will be readily understood. It will thus be seen that when armature 5 is released by its magnet the alarm-train will be set in motion, even though it be held for the moment by the mechanism of the time-train.

It is to be noted that no signal will be given by this instrument, except such as the instrument is specially intended to indicate—as, for instance, an unauthorized entry into a building or a fire—and that after each original signal or alarm the same signal will be repeated at predetermined intervals until the place from where such signal is given be visited and the instrument reset. In prior systems involving the use of signaling instruments operated by timing mechanism signals are given at predetermined intervals to show that the system is in proper working condition, such signals being mere test-signals, and no distinction is made between such signals sent before an alarm signal and those sent after, and there is therefore nothing to positively indicate whether attention has been given to a danger-signal or not. With my instrument the repetition of an alarm-signal insures proper attention both to the original cause of the alarm and the resetting of the system or apparatus in proper working order, and so long as no cause arises for an alarm the instrument remains at rest, and therefore does not require attention to note that the mechanism is wound up, as is the case with timing mechanism that is kept constantly running. It is also to be noted that the brushes 10, 11, and 12, which coöperate with the circuit-breaking wheels 7, 8, and 9, are mounted on an insulating-block 97 and that the circuit-breaking wheels are insulated from the shaft 15, upon which they are mounted. This eliminates any element of danger that might be occasioned by the grounding of the current through the clock mechanism, as is the case where the clock mechanism itself forms a passage for the current, as is usually the case with prior instruments of this class. There is always danger where an electric-light wire accidentally crosses a line-wire of the system, and a current from such a source passing through the clock mechanism would be apt to result in damage of a more or less serious character.

Having thus described my invention, what I claim as new, and desire to secure by Letters Patent, is—

1. In an electric signaling system, the combination of a normally closed metallic circuit connecting the place to be signaled from with a signal-receiving station, a ground connection in said circuit dividing the batteries thereof, one or more signaling instruments within said circuit adapted to automatically ground said circuit and transmit signals thereover at both sides of such ground, and means for indicating an increase of current through the first-mentioned ground connection, substantially as and for the purposes specified.

2. In an electric signaling system, the combination of a normally closed metallic circuit connecting the place to be signaled from with a signal-receiving station, a signaling instrument adapted to automatically ground said circuit and transmit a signal thereover to said receiving-station, and means for causing the operation of said instrument when the latter is looped out of said main circuit, substantially as described.

3. In an electric signaling system, the combination of a normally closed metallic circuit connecting the place to be signaled from with a signal-receiving station, a ground connection dividing the batteries of said circuit at said receiving-station, signal receiving or recording instruments controlled by the main-line current at each side of said ground connection, a signaling instrument adapted to automatically ground said circuit and transmit signals over the two earth-circuits thus established, an electromagnet within a local circuit for controlling the operation of said instrument, and means for causing said magnet to operate said instrument when the latter is cut out of the main circuit, substantially as described.

4. In an electric signaling system, the combination of a normally closed metallic circuit connecting the place to be signaled from with a signal-receiving station, a ground connection dividing the batteries of said circuit at said receiving-station, signal receiving or recording instruments controlled by the main line at each side of said ground connection, a signaling instrument adapted to automatically ground said circuit and transmit signals over the two ground-circuits thus established, an electromagnet within a local circuit controlling the operation of said instrument, a relay within the main circuit adapted to short-circuit said magnet when the resistance of the main line is removed from said relay, substantially as and for the purposes specified.

5. In an electric signaling system, the combination of a normally closed metallic circuit connecting the place to be signaled from with a signal-receiving station, a ground connection in said circuit dividing the batteries thereof, separate signal-receiving instruments controlled by said circuit at both sides of said ground connection, a signaling instrument, a normally open relay in said ground connection for controlling said instrument, and a signaling instrument at the place to be signaled from adapted to automatically ground said circuit and transmit a signal over the two earth-circuits thus established, substantially as and for the purposes specified.

6. In an electric signaling instrument, the combination of a circuit-breaking wheel or wheels, mechanism for rotating said wheel or wheels, a tripping device for said mechanism, an electromagnet for operating said tripping device, and means operative only after said tripping device has been first operated by said electromagnet for causing said wheels to be revolved at predetermined intervals, substantially as described.

7. In an electric signaling instrument, the combination of a circuit-breaking wheel or wheels, mechanism for rotating said wheels, a tripping device for said mechanism, an electromagnet for operating said device, mechanism for operating said device independently of the operation of said electromagnet, and means for preventing the operation of said last-mentioned mechanism until after said tripping device has been first operated by said magnet, substantially as described.

8. In an electric signaling instrument, the combination of a circuit-breaking wheel or wheels driven by windable mechanism, a tripping device for said mechanism, an electromagnet for operating said device, clock mechanism for operating said tripping device at predetermined intervals, and means whereby said clock mechanism will be prevented from operating said tripping device until after said device has been first operated by said electromagnet, substantially as described.

9. In an electric signaling instrument, the combination of a circuit-breaking wheel or wheels driven by windable mechanism, a tripping device for said mechanism, an electromagnet for causing the operation of said device, clock mechanism for operating said tripping device at predetermined intervals, and means for holding said clock mechanism in check controlled by said electromagnet, substantially as described.

10. In an electric signaling instrument, the combination of a circuit-breaking wheel or wheels, mechanism for rotating said wheel or wheels, a tripping device for said mechanism, clock mechanism for operating said device at predetermined intervals, a tripping device for said clock mechanism, and an electromagnet for simultaneously operating both tripping devices, substantially as described.

11. In an electric signaling instrument, the combination of a circuit-breaking wheel or wheels, mechanism for driving said wheel or wheels, a tripping device for said mechanism, clock mechanism for operating said device at predetermined intervals, a device for holding said clock mechanism in check adapted when released to give a starting impulse to said clock mechanism, and an electromagnet for holding said device in its operative position, substantially as described.

12. In an electric signaling instrument, the combination of a circuit-breaking wheel or wheels, mechanism for driving said wheel or wheels, a tripping device for said mechanism, clock mechanism for operating said device at predetermined intervals, a device for holding said clock mechanism in check adapted when released to give a starting impulse to said clock mechanism, and an electromagnet for controlling the operation of said device, substantially as described.

13. In an electric signaling instrument the combination of a circuit-breaking wheel or wheels, mechanism for driving said wheel or wheels, a detent for normally holding said mechanism in check which when moved for releasing said mechanism will again check the same after the latter has revolved said wheel or wheels a predetermined number of revolutions, an electromagnet for moving said detent, a clock-movement for moving said detent at predetermined intervals, and means for preventing said clock-movement and its connecting mechanism from interfering with a movement of said detent by said magnet, substantially as described.

14. In an electric signaling instrument, the combination of a circuit-breaking wheel or wheels, mechanism for driving said wheel or wheels, a detent for normally holding said mechanism in check which when moved for releasing said mechanism will again check the same after the latter has revolved said wheel or wheels a predetermined number of revolutions, an electromagnet for moving said detent, a clock-movement for moving said detent at predetermined intervals, and means controlled by said magnet for normally holding said clock-movement in check, substantially as described.

In testimony whereof I have hereunto set my hand in presence of two subscribing witnesses.

ROBERT G. CALLUM.

Witnesses:
M. G. ANDERSON,
J. W. TAYLOR.